United States Patent [19]

Nagoshi et al.

[11] Patent Number: 4,645,249

[45] Date of Patent: Feb. 24, 1987

[54] CORE FOR AN AUTOMOBILE BUMPER

[75] Inventors: Toshiharu Nagoshi, Osaka; Hidehiko Totsuka, Tokyo; Takeshi Taira, Yokohama; Youkichi Gotoh, Suita; Kazuya Senuma, Kobe, all of Japan

[73] Assignee: Kanegafuchi Kagaku Kogyo Kabushiki Kaisha, Osaka, Japan

[21] Appl. No.: 762,170

[22] Filed: Aug. 5, 1985

[30] Foreign Application Priority Data

Aug. 14, 1984 [JP] Japan .................................. 59-169552

[51] Int. Cl.$^4$ ......................... B32B 5/18; E05C 19/10
[52] U.S. Cl. .................................... 293/102; 293/120; 521/56; 521/60; 428/71; 428/304.4; 428/319.9
[58] Field of Search .............. 521/56, 58, 60; 428/71, 428/76, 318.6, 319.9, 304.4; 293/120, 102

[56] References Cited

U.S. PATENT DOCUMENTS 4,504,534  3/1985  Adachi et al. ........................ 428/71

Primary Examiner—Alexander S. Thomas
Attorney, Agent, or Firm—Armstrong, Nikaido, Marmelstein & Kubovcik

[57] ABSTRACT

A core for an automobile bumper comprising a foam having a bulk density of 0.047 to 0.18 g/cm$^3$, the foam being made of an ethylene-propylene random copolymer having an ethylene content of 0.1 to 8.0% by weight, and largely improved in an energy absorption capacity at small strain by means of defining the ratio of ethylene to propylene and the bulk density of a foam.

3 Claims, 3 Drawing Figures

CORE FOR AN AUTOMOBILE BUMPER

BACKGROUND OF THE INVENTION

The present invention relates to a core for an automobile bumber.

In recent years, a bumper made of a synthetic resin has been developed in place of a bumper made of a metal according to a tendency to make an automobile lighter. Then, a bumper comprising a core made of a synthetic resin foam body and a cover made of a non-foamed synthetic resin (a block body of synthetic resin) which covers the core has been employed.

The core is an important element which influences the efficiency of an automobile bumper. Therefore, it has been required that the core is not only light but also superior in an energy absorption capacity.

Hitherto, for an above-mentioned core, there have been employed
(1) a hydraulic shock absorber,
(2) a polyurethane resin foam and
(3) a foam comprising polystyrene and polyethylene disclosed by Japanese Unexamined Patent Publication (Tokkyo-Kokai) No. 40136/1982.

However, (1) a hydraulic shock absorber is heavier in comparison with foam and is required a long stroke to absorb a shock energy. As a result, the free design at the front of the body of an automobile is limited. (2) A polyurethane resin foam has disadvantages in quality that an energy absorption capacity and a dimensional recovery ratio as an automobile bumper decrease because a polyurethane resin foam degrades by hydrolysis caused by water in air little by little. In order to prevent a degradation, a foam should have high bulk density (i.e. 0.1 to 0.3 g/cm$^3$), which goes against a tendency to make an automobile lighter. (3) A foam comprising polystyrene and polyethylene is resistive against a degradation by hydrolysis and light in weight. But it is short of chemical resistance (gasoline resistance) and heat resistance (heat resistance such that it is not deformed under exposure to the scorching heat of sun, i.e. about 90° C.) Accordingly, it is not suitable for a core of a bumper.

As an improvement of above-mentioned materials, a polypropylene foam is disclosed by Japanese Unexamined Patent Publication (Tokkyo-Kokai) No. 221745/1983. The polypropylene foam has a bulk density of 0.015 to 0.045 g/cm$^3$ and of which compressive stress at 50% compression is more than 1 kg/cm$^2$. But such compressive stress is not sufficient to absorb a shock energy on condition that a stroke is short (i.e. strain is small), and a dimensional accuracy in core product becomes loose. Accordingly, such a polypropylene foam is far from an ideal core.

As a result of our researches to remove the above disadvantages, in spite of using a conventional polypropylene resin we have eventually found a core largely improved in an energy absorption capacity of foam made of a polypropylene resin at small strain by means of defining the ratio of ethylene to propylene (% by weight) and the bulk density of foam.

Accordingly, it is an objection of the present invention to provide a core for an automobile bumper which is stable in quality, light in weight and superior in an energy absorption capacity and a dimensional stability which are required for a bumper.

SUMMARY OF THE INVENTION

A core for an automobile bumper according to the present invention comprises a foam having a bulk density of 0.047 to 0.18 g/cm$^3$, preferably 0.052 to 0.075 g/cm$^3$, the foam being made of an ethylene-propylene random copolymer having an ethylene content of 0.1 to 8.0% by weight, preferably 2.0 to 5.0% by weight.

DETAILED DISCRIPTION

Figure 1:
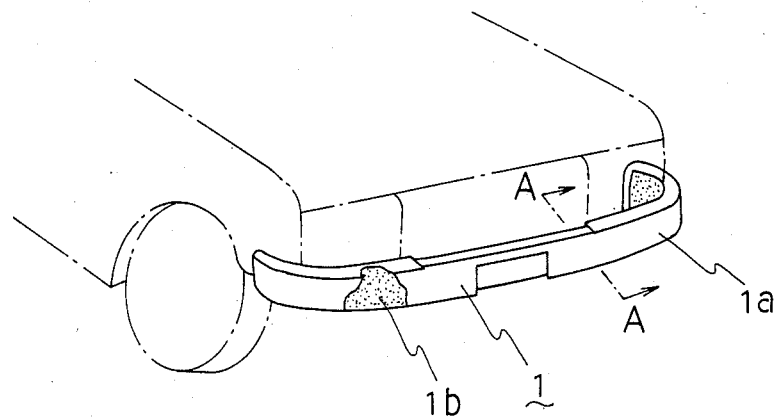
FIG. 1 is a view of external appearance of a bumper comprising a core of the present invention, the bumper being mounted on the front of an automobile.
Figure 2:
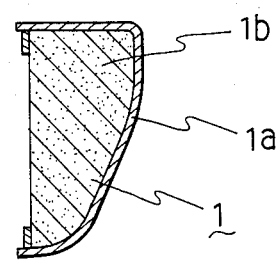
FIG. 2 is a sectional view taken on line A—A of FIG. 1.

A bumper 1 has a construction that a core is covered with a cover 1a. For a cover 1a reaction injection moldings of polyurethane resin or injection moldings of polypropylene copolymer, for example, are employed. A core 1b is prepared as follows: Ethylene-propylene random copolymer pellets are dispersed into water using powdery basic calcium tertiary phosphate and sodium dodecylbenzenesulfonate as a dispersing agent in a pressure vessel with a stirrer. After deaerating the vessel by a vacuum pump with stirring, dichlorodifluoromethane is added and they are heated to 120° to 165° C. Liquid dichlorodifluoromethane is added into a vessel under pressure with adjusting a valve. An inner pressure being kept 15 to 30 kg/cm$^2$, a discharge value at the lower part of a pressure vessel is opened and a mixture of pellets and water is released into the atmosphere under normal pressure through an orifice disposed after the valve. Prefoamed beads which are prepared as described above are molded by conventional beads-molding method, then a foam having a bulk density of 0.047 to 0.18 g/cm$^3$ can be prepared.

EXAMPLE 1

A core 1b was prepared under the following conditions.

100 parts by weight of ethylene-propylene random copolymer pellets having an ethylene content of 2.5% by weight (0.90 g/cm$^3$ in density) were dispersed into 300 parts by weight of water using 1.0 parts by weight of powder basic calcium tertiary phosphate and 0.025 parts by weight of sodium dodecylbenzenesulfonate as a dispersing agent in a pressure vessel of 1 m$^3$ in volume with a stirrer. After deaerating the vessel by a vacuum pump with stirring, 30 parts by weight of dichlorodifluoromethane was added and they were heated to 146° C. Liquid dichlorodifluoromethane was added into a vessel under pressure with adjusting a valve. An inner pressure being kept 26 kg/cm$^2$, a discharge valve at the lower part of a pressure vessel was opened, and a mixture of pellets and water was released into the atomosphere under normal pressure through an orifice of 4 mm in diameter disposed after the valve. Prefoamed beads which were prepared as described above were molded by conventional beads-molding method so as to prepare foam having a bulk density of 0.047 g/cm$^3$. The size of copolymer pellets is 50 mg/100 beads to 780 mg/100 beads, preferably 100 mg/100 beads to 180 mg/100 beads.

Figure 3:
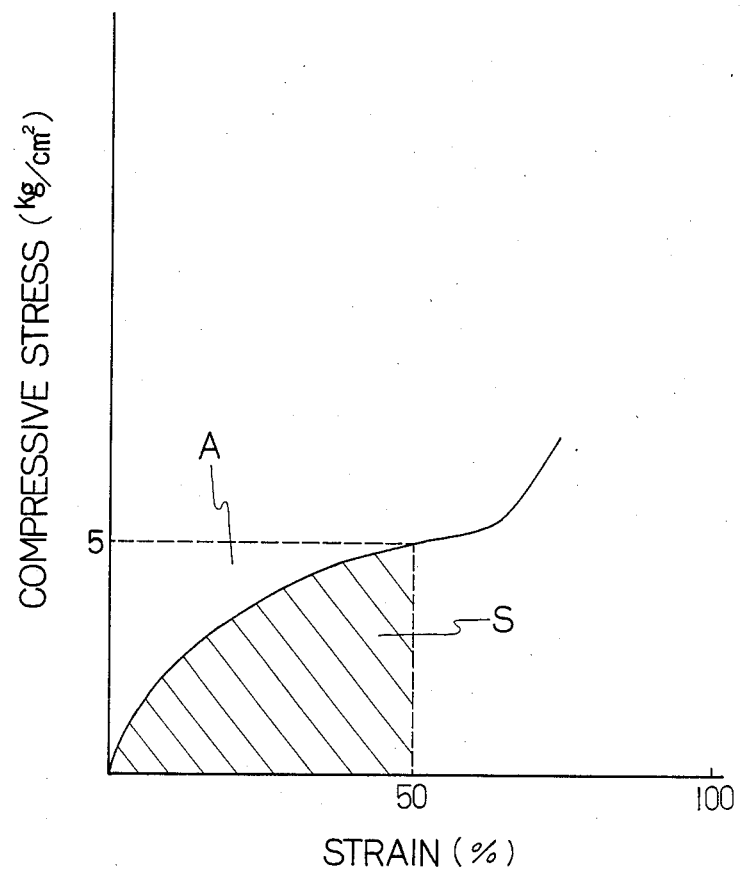
FIG. 3 is a view of compression stress-strain curve of the core.

In the same manner as described above, several kinds of copolymer pellets having different content ratio of ethylene by changing the weight of dichlorodifluoromethane, the heating temperature and the inner pressure as thought to be proper were used so as to prepare several kinds of resin foams having different bulk densities. Compression stress of them were measured. The results are summarized in Table 1, wherein an energy absorption capacity is represented by an energy absorption ratio which is obtained by the following equation. In the equation, the areas A or S shown in FIG. 3 (compression stress - strain curve) are used as factors.

The energy absorption ratio = $S/(A+S) \times 100$ The dimensional stability is represented by the dimensional scatter which is obtained by measuring hundred pieces of moldings.

Further, as a comparative example, properties of moldings having an ethylene content of 0%, 10% by weight, a bulk density of 0.05 g/cm$^3$, 0.055 g/cm$^3$ respectively and an ethylene content of 5% by weight, a bulk density of 0.31 g/cm$^3$ are also summarized in Table 1.

TABLE 1

|  | Content ratio of ethylene (%) | Bulk density of foam moldings (g/cm$^3$) | Energy absorption ratio | Dimensional scatter of molding |
|---|---|---|---|---|
| Example | 0.1 | 0.051 | A | A |
|  | 2.5 | 0.18 | A | A |
|  | 2.5 | 0.061 | A | A |
|  | 2.5 | 0.047 | B | A |
|  | 5.0 | 0.062 | A | A |
|  | 8.0 | 0.07 | B | B |
| Comparative Example | 0 | 0.05 | C | A |
|  | 10 | 0.055 | D | D |
|  | 5.0 | 0.31 | C | A |
|  | 2.5 | 0.043 | C | B |
|  | 2.5 | 0.20 | C | A |

The energy absorption ratio and the dimensional stability were investigated as follows:

Energy absorption ratio: The energy absorption ratio is calculated according to the compression stress-strain curve, in which a foam molding having a size of 100×100×50 mm is compressed at 23° C., at the speed of 222 cm/sec. The energy absorption ratio is estimated according to the following criteria.

A. more than 88%
B. 80 to 87%
C 61 to 79%
D. less than 60%

Dimensional stability: The polyolefine beads were foamed in a mold of 100×100×1200 mm in size so as to prepare a hundred peices of moldings. The dimensional scatter of molding was surveyed. The dimensional stability is estimated according to the following criteria.

A. R=less than 0.7%
B. R=0.8 to 1.0%
C. R=1.1 to 1.9%
D. R=more than 2.0%

As is known from Table 1, differences between a group of the present invention and a group of the comparative examples based on the differences of the content ratio of ethylene and the bulk density of foam are clear. The group of the present invention is superior to the group of the comparative examples in the energy absorption capacity and the dimensional stability.

In case that the bulk density of a foam body of synthetic resin is larger than the above-mentioned range, it is not worth employing the foam body instead of a block body of synthetic resin since such a foam body is not effective in decreasing the weight of an automobile. On the other hand, in case that the bulk density of a foam body is smaller than the above-mentioned range, such a foam body cannot be employed since energy absorption capacity and dimensional stability become worse.

What is claimed is:

1. In an automobile automobile bumper comprising a foam having a bulk density of 0.047 to 0.18 g/cm$^3$, said foam being made of an ethylene-propylene random copolymer having an ethylene content of 0.1 to 8.0% by weight.

2. A core of claim 1, wherein the content of ethylene is 2.0 to 5.0% by weight.

3. A core of claim 1, wherein the bulk density is 0.052 to 0.075 g/cm$^3$.

* * * * *